3,752,814
2-BROMO-α-ERGOCRYPTINE
Edward Fluckiger, Binningen, and Franz Troxler and Albert Hofmann, Bottmingen, Switzerland, assignors to Sandoz Ltd. (also known as Sandoz AG), Basel, Switzerland
No Drawing. Continuation-in-part of application Ser. No. 827,144, May 23, 1969. This application Sept. 9, 1971, Ser. No. 179,169
Claims priority, application Switzerland, May 31, 1968, 8,168/68
Int. Cl. C07d 51/70
U.S. Cl. 260—268 PE                2 Claims

ABSTRACT OF THE DISCLOSURE

The invention concerns 2-bromo-α-ergocryptine of the formula

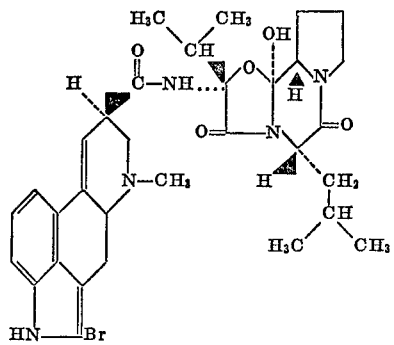

and pharmaceutically acceptable acid addition salts thereof.

The compounds are useful in inhibiting lactation, i.e. they inhibit the secretion of luteotropic hormone and furthermore exhibit antifertility properties.

---

This is a continuation-in-part of application Ser. No. 827,144, filed May 23, 1969, now abandoned.

The present invention relates to 2-bromo-α-ergocryptine of Formula I,

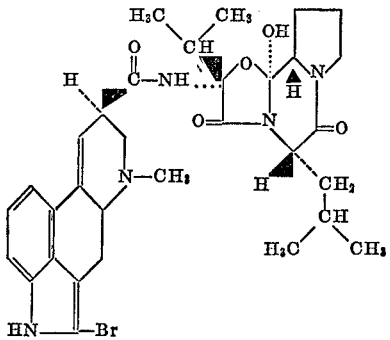

and acid addition salts thereof.

2-bromo-α-ergocryptine and its acid addition salts may be obtained in accordance with the invention by brominating ergocryptine in a solvent, which is inert under the reaction conditions, with a mild brominating agent, e.g. N-bromophthalimide, N-bromosuccinimide or N-bromocaprolactam, purifying the resulting 2-bromo-α-ergocryptine in manner known per se and then optionally converting it into its acid addition salts.

Suitable brominating agents are amides or imides, brominated on the nitrogen atom, of aliphatic or aromatic carboxylic or sulphonic acids, e.g. N-bromophthalimide, N-bromosuccinimide or N-bromocapro-lactam (1 to 3 mols) or a bromo-dioxane complex (0.5 mol $Br_2$).

Bromination is conveniently effected in an inert, polar solvent, e.g. dioxane, acetonitrile or methylene chloride, at a temperature between 10 and 80° C.

Purification of the resulting crude 2-bromo-α-ergocryptine may be effected in conventional manner, e.g. by chromatography and/or recrystallization.

2-bromo-α-ergocryptine is a crystalline substance at room temperature and forms stable salts, which are crystalline at room temperature, with organic or inorganic acids. Examples of acids which may be used for salt formation are inorganic acids, such as hydrochloric, hydrobromic or sulphuric acid, or organic acids, such as oxalic, tartaric or methanesulphonic acid.

2-bromo-α-ergocryptine and its pharmaceutically acceptable acid addition salts inhibit the secretion of luteotropic hormone (prolactin) and are useful because of their antifertility properties, which differ from similar representatives of the ergotoxine group, e.g. α-ergocryptine or ergocornine, in that (1) their effect is more specific, and
(2) they are better tolerated.

2-bromo-α-ergocryptine and its pharmaceutically acceptable acid addition salts exhibit the above-mentioned properties at daily dosages ranging from about 0.6 milligram to about 2.5 milligrams per kilogram animal body weight. However, for larger mammals, suitable daily doses range from about 2 to about 20 mg., in view of the specificity of action.

The properties of 2-bromo-α-ergocryptine indicated above may be ascertained as follows:

(1) Antifertility effect

Each of two fertile female rats (control and test animal) is placed with an experienced male rate in a cage for a period of 19 days. The test preparation or pure solvent is injected subcutaneously to the female rats on the 5th, 10th and 15th day of the test. During the autopsy on the 19th day the uterine horns are examined under a magnifying glass for implantations and resorptions. Each dose group consists of 11 test animals and the same number of control animals. Evaluation of the test is effected by making the fertility of the test animals equivalent to 100% and expressing the fertility decrease of the test animals as a percentage. These tests are repeated with different doses in order to ascertain the relationship between dose and effect and to determine an $ED_{50}$.

Table I gives a summary of the results of such a test series. An $ED_{50}$ of 0.75 mg./kg. may be calculated from the fertility inhibition values in accordance with the test method of Litchfield and Wilcoxon, J. Pharmacol, 96, 99 (1949).

TABLE I

| Dose, mg./kg. | Antifertility effect, percent | Number of fetus for every pregnant animal | | Number of resorptions | |
|---|---|---|---|---|---|
| | | V | K | V | K |
| 0.25 | 0 | 10.3 | 10.3 | 5 | 8 |
| 0.5 | 0 | 10.9 | 11.3 | 8 | 10 |
| 0.65 | 40 | 11.2 | 10.4 | 4 | 8 |
| 0.75 | 50 | 12.2 | 9.3 | 0 | 9 |
| 0.85 | 55 | 11.6 | 11.3 | 11 | 6 |
| 1.0 | 80 | 12.0 | 10.7 | 3 | 9 |
| 1.25 | 91 | 12.0 | 10.6 | 1 | 4 |
| 2.5 | 100 | | 10.9 | 0 | 3 |
| 20.0 | 100 | | 11.2 | 0 | 9 |

NOTE.—V=Test animals; K=Control animals.

(2) Determination of the specificity of the antifertility effect

In what follows the quantitative ratios of implantation inhibition and lactation inhibition of 2-bromo-α-ergocryptine are examined and compared with those of α-ergocryptine.

The method used for determining lactation inhibition is as follows:

Each of a number of female rats having a body weight of 180–200 g. is placed together with a breeding male. About 18–19 days later, i.e. shortly before the births, the pregnant female animals were individually placed in fresh tubs. Only 8 young animals of a brood were left with the mother animals. The broods were weighed with the exactness of 1 gram beginning from the first day in the morning. The test substance was injected subcutaneously to the lactating mother animal on the 6th, 7th or 8th day after birth of the young animals, in the evening. The next day the broods were weighed in the morning and in the evening and on the following days only in the morning.

Evaluation of the dose-effect relationship

Young animals from control broods, the mother animals of which were only treated with solvent, show an average percent weight increase from the day of the injection to the morning of the following day of 100% to 114.2%. The difference of 14.2% gives the standard for determining lactation inhibition. An average percent weight increase of a young animal from the morning of the injection day to the first weighing the following morning of 14.2% is defined as a lactation inhibition of 0%. Therefore, a weight increase of only 7.1% is considered as a 50% lactation inhibition and a complete stagnation of weight development during the period in question is considered as a 100% lactation inhibition.

The results obtained with 2-bromo-α-ergocryptine and α-ergocryptine are indicated in the following Table II.

TABLE II

| 2-bromo-α-ergocryptine | | α-ergocryptine | |
|---|---|---|---|
| Dose, mg./kg. | Lactation inhibition, percent | Dose, mg./kg. | Lactation inhibition, percent |
| 0.33 | 14 | | |
| 0.50 | 24 | 0.60 | 58 |
| 0.75 | 28 | | |
| 1.10 | 29 | | |
| 1.70 | 46 | 1.15 | 71 |
| 2.50 | 40 | 1.50 | 69 |
| 3.80 | 45 | 2.1 | 89 |

As has already been indicated in Table I, 2-bromo-α-ergocryptine exerts a fertility inhibition in rats which is strongly dependent on the dose. The compound also inhibits lactation, depending on the dose. It is surprising, however, that the relationship dose:effect of lactation inhibition in rats progresses more slowly than fertility inhibition. The values for the $ED_{50}$ are therefore different. After repeated tests the $ED_{50}$ for fertility inhibition is 0.7 to 0.8 mg./kg. s.c., and for lactation inhibition about 3.5 mg./kg. s.c. or higher. It is therefore possible to obtain an almost complete implantation inhibition with doses that only slightly impair the milk supply of the young animals. In other words, the two effects of 2-bromo-α-ergocryptine, i.e. implantation and lactation inhibition, show very different dose dependencies. As opposed to this, the dose dependency of fertility inhibition and lactation inhibition in the case of α-ergocryptine is very similar. In the case of α-ergocryptine a dose which exerts a complete implantation inhibition also inhibits lactation completely. 2-bromo-α-ergocryptine, however, shows a specific implantation inhibiting effect in rats.

Different animal species exhibit different sensitivity to treatment with 2-bromo-α-ergocryptine, and hence the dosage required to obtain satisfactory inhibition of lactation varies over a fairly wide range. Thus, for example, 2-bromo-α-ergocryptine is only moderately active in inhibiting lactation in the rat at a dose as high as about 4 mg./kg. animal body weight. In the rabbit on the other hand, a lactation inhibiting effect is observed at a subcutaneous dose of about 0.5 mg./kg. animal body weight [method employed by Cowie A. T.: J. Endocr. 44, 437 (1969)]. A single subcutaneous dose of about 1 mg./kg. in the rabbit shows a lactation inhibiting effect of about 70% which lasts for about four days. After this period, milk yield regains the pretreatment level. Subcutaneous doses of 2 and 10 mg./kg. show inhibition of milk yield to about the same extent, but at these doses no recovery is observed within nine days. Observations in a mini-pig (of a weight of about 59 kg.) showed that three intramuscular doses of 0.1 mg./kg. in one day was followed by a phase of inhibited growth of the litter, which evidenced temporary inhibition of milk production. Observations with regular pigs (of weights ranging from 150 to about 180 kg.) showed that weight gain of the litters is inhibited in a significant dose-dependent fashion at intramuscular doses between 0.03 and 0.81 mg./kg. The mg./kg. dose at which satisfactory results are obtained in larger mammals of weight greater than about 2 kg. is from about 0.03 mg./kg. to about 1.0 mg./kg., conveniently given in divided doses two to three times a day or in sustained release form. For the larger mammals, the total practical daily dosage is in the range of from about 3 to about 15 mg. given in divided doses 2 or 3 times a day or in sustained release form. Convenient unit dosage forms suitable for oral administration contain from about 1 mg. to about 5 mg. of the compound, in association with pharmaceutical carriers or diluents. The dosage administered will, of course, vary depending upon the mode of administration and the extent of inhibition desired.

The methane sulphonate is a convenient pharmaceutically acceptable acid addition salt form of 2-bromo-α-ergocryptine. Capsules or tablets containing the unit dose of 2-bromo-α-ergocryptine in association with starches, sugars, talcum and the like are dosage forms suitable for oral administration. Injectable solutions, for example for administration by infusion, contain the 2-bormo-α-ergocryptine in association with conventional sterile diluents.

(3) Tolerance (a) Acute toxicity.—The $LD_{50}$ (dose for a 50% mortality) on oral or intravenous administration was determined in tests with rabbits. The observation time after a single administration of the compound covered a period of 7 days. The results may be seen in Table III, which also contains the comparison data for α-ergocryptine.

TABLE III

| | Rabbits, $LD_{50}$ (mg./kg.) | |
|---|---|---|
| Preparation | Oral | I.V. |
| 2-bromo-L-ergocryptine | >1,000 | 12.0 |
| α-ergocryptine | | 0.95 |

(b) Emetic effect.—Waking dogs react to parenterally administered ergot alkaloids at a certain dose range with vomiting; this may be interpreted as a central nervous effect of these peptide alkaloids. This vomiting may be released by slow i.v. administration of ergotamine with an $ED_{50}$ of 2.5 μg./kg. α-Ergocryptine shows a similar activity; the $ED_{50}$ is 2.6 μg./kg. 2-bromo-α-ergocryptine also has an emetic effect, but its $ED_{50}$ is 7.5 μg./kg. Therefore, 2-bromo-α-ergocryptine has an emetic effect which is 2.8 times lower than that of α-ergocryptine and 3 times lower than that of ergotamine.

The vasotonic effect of 2-bromo-α-ergocryptine is also weak as compared with that of known, natural or partially synthetically obtained ergot alkaloids.

2-bromo-α-ergocryptine may be used as pharmaceutical on its own or in the form of appropriate medicinal preparations for enteral or parenteral administration. In order to produce suitable medicinal preparations the compound may be combined with inorganic or organic adjuvants which are pharmacologically inert. Examples of such adjuvants are:

for tablets and dragées: lactose, starch, talcum and stearic acid;
for syrups: solutions of cane sugar, invert sugar and glucose;
for injectable solutions: water, alcohols, glycerin and vegetable oils;
for suppositories: natural or hardened oils and waxes.

The preparations may furthermore contain suitable preserving, stabilizing and wetting agents, solubilizers, sweetening and colouring agents and flavourings.

In the following non-limitative examples all temperatures are indicated in degrees centigrade and are corrected.

EXAMPLE 1

2-bromo-α-ergocryptine

A solution of 3.4 g. of N-bromosuccinimide in 60 cc. of absolute dioxane is added dropwise in the dark, during the course of 5 minutes, to a stirred solution, heated to 60°, of 9.2 g. of ergocryptine in 180 cc. of absolute dioxane. The reaction mixture is stirred at this temperature for 70 minutes and is concentrated to a syrup-like consistency in a rotary evaporator at a bath temperature of 50°. The reaction mixture is subsequently diluted with 300 cc. of methylene chloride, is covered with a layer of about 200 cc. of a 2 N sodium carbonate solution in a separating funnel and is shaken thoroughly. The aqueous phase is extracted thrice with 100 cc. amounts of methylene chloride. The combined organic phases are washed once with 50 cc. of water, are dried over sodium sulphate and the solvent is removed under a vacuum.

The resulting brown foam is chromatographed on a 50-fold quantity of aluminium oxide of activity II–III with 0.2% ethanol in methylene chloride as eluant, whereby the compound indicated in the heading is eluted immediately after a secondary fraction which migrates somewhat more rapidly than the fractions containing the heading compound. The last fractions to leave the aluminium oxide contain varying amounts of starting material together with the heading compound, and may be subjected directly, as mixed fractions, to an afterbromination in accordance with the method descibed above. The fractions containing the pure heading compound are combined and crystallized from methylethyl ketone/isopropyl ether. Melting point 215–218° (decomp.), $[\alpha]_D^{20} = -195°$ (c.=1, methylene chloride).

Paper chromatographic identification:

Stationary phase: 25% formamide
Mobile phase: ether/carbon tetrachloride (1:1)
Rf values:
    2-bromo-α-ergocryptine 0.88
    α-ergocryptine 0.70

Methane sulphonate: From methyl-ethyl ketone. Melting point 192–196° (decomposition), $[\alpha]_D^{20} = +95°$ (c.=1, methanol:methylene chloride=1:1).

EXAMPLE 2

2-bromo-α-ergocryptine

A solution of 9.2 g. of ergocryptine in 200 cc. of absolute dioxane is combined with a solution of 5.1 g. of N-bromo-caprolactam in 300 cc. of dioxane and the resulting dark reaction mixture is stirred at room temperature for 6 hours. The reaction mixture is concentrated by evaporation and is then worked up as indicated in Example 1. The resulting foam is chromatographed on a 50-fold quantity of silica gel with 3% of ethanol in methylene chloride as eluant. The compound of the heading is immediately obtained in pure form. The physical data of this compound agree with those indicated in Example 1.

EXAMPLE 3

2-bromo-α-ergocryptine

A solution of 92.5 mg. of ergocryptine in 2 cc. of absolute dioxane is combined with a solution of 43.4 mg. of N-bromophthalimide in 2 cc. of dioxane and the resulting dark reaction mixture is stirred at room temperature for 6 hours. The reaction mixture is concentrated by evaporation and is then worked up as indicated in Example 1. The resulting foam is chromatographed on a 50-fold quantity of silica gel with 3% of ethanol in methylene chloride as eluant. The title compound is immediately obtained in pure form. The physical data of this compound agree with those indicated in Example 1.

EXAMPLE 4

2-bromo-α-ergocryptine

A solution of 922 mg. of ergocryptine in 18 cc. of absolute dioxane is combined with a solution of 0.04 cc. of $Br_2$ in 6 cc. of dioxane and the resulting dark reaction mixture is stirred at room temperature for 2 hours. The reaction mixture is concentrated by evaporation and is then worked up as indicated in Example 1. The resulting foam is chromatographed on a 50-fold quantity of silica gel with 3% of ethanol in methylene chloride as eluant. The title compound is immediately obtained in pure form. The physical data of this compound agree with those indicated in Example 1.

Oral dosage forms (capsules or tablets) which contain the following ingredients may be prepared by conventional techniques. Such capsules or tablets are useful for inhibiting lactation in larger female mammals at a dose of one tablet two or three times a day.

EXAMPLES 1 AND 2

Tablets and capsules suitable for oral administration

Tablets and capsules containing the ingredients indicated below may be prepared by conventional techniques and are useful in inhibiting lactation at a dose of one tablet or capsule 2 to 4 times a day.

| Ingredient | Weight (mg.) | |
|---|---|---|
| | Tablet | Capsule |
| 2 bromo-α-ergocryptine | 1 | 1 |
| Tragacanth | 10 | |
| Lactose | 246.5 | 299 |
| Corn starch | 24 | |
| Talcum | 15 | |
| Magnesium stearate | 2.5 | |
| Total | 300 | 300 |

EXAMPLES 3 AND 4

Tablets and capsules suitable for oral administration

Tablets and capsules containing the ingredients indicated below may be prepared by conventional techniques and are useful in inhibiting lactation at a dose of one tablet or capsule 2 to 4 times a day.

| Ingredient | Weight (mg.) | |
|---|---|---|
| | Tablet | Capsule |
| Active agent | 5 | 5 |
| Tragacanth | 10 | |
| Lactose | 242.5 | 295 |
| Corn starch | 25 | |
| Talcum | 15 | |
| Magnesium stearate | 2.5 | |
| Total | 300 | 300 |

EXAMPLES 5 AND 6

Sterile suspension for injection and oral liquid suspension

The following pharmaceutical compositions are formulated with the indicated amount of active agent using conventional techniques. The injectable suspension and the oral liquid suspension represent formulations useful as unit doses and may be administered in inhibiting lactation. The injectable suspension is suitable for administration once a day whereas the oral liquid suspension is suitably administered 2 to 4 times per day for this purpose.

| Ingredient | Weight (mg.) | |
|---|---|---|
| | Sterile Injectable suspension | Oral liquid suspension |
| 2-bromo-α-ergocryptine | 1 | 1 |
| Sodium carboxy methyl cellulose, U.S.P. | 1.25 | 12.5 |
| Methyl cellulose | 0.4 | |
| Polyvinylpyrrolidone | 5 | |
| Lecithin | 3 | |
| Benzyl alcohol | 0.01 | |
| Magnesium aluminium silicate | | 47.5 |
| Flavor | | Q.s. |
| Color | | Q.s. |
| Methyl paraben, U.S.P. | | 4.5 |
| Propyl paraben, U.S.P. | | 1.0 |
| Polysorbate 80 (e.g. Tween 80), U.S.P. | | 5 |
| Sorbitol solution, 70% U.S.P. | | 2,500 |
| Buffer agent to adjust pH for desired stability | Q.s. | Q.s. |
| Water | (¹) | (²) |

¹ For injection, q.s. to 1 ml.
² Q.s. to 1 ml.

What is claimed is:
1. 2-bromo-α-ergocryptine of the formula

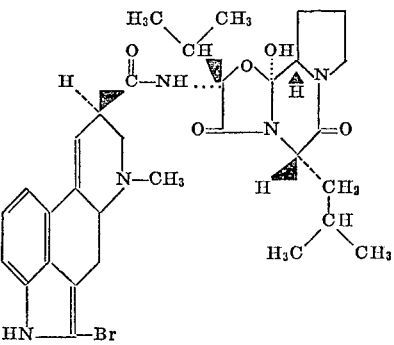

or a pharmaceutically acceptable acid addition salt thereof.
2. The compound of claim 1, which is the methane sulphonate of 2-bromo-α-erogocryptine.

References Cited
UNITED STATES PATENTS

| 2,507,831 | 5/1950 | Stou et al. | 260—285.5 |
| 2,516,002 | 7/1950 | Hofmann et al. | 260—285.5 |
| 3,218,324 | 11/1965 | Hofmann et al. | 260—285.5 |

FOREIGN PATENTS

| 1,345,864 | 11/1963 | France | 260—285.5 |

OTHER REFERENCES

Fluckiger et al., Chem. Abstr., vol. 70, Coc 2199r (1969).

DONALD G. DAUS, Primary Examiner

U.S. Cl. X.R.
424—250, 261